(12) United States Patent
Arai et al.

(10) Patent No.: US 7,022,794 B2
(45) Date of Patent: Apr. 4, 2006

(54) PROCESS FOR PRODUCING OLEFIN/AROMATIC VINYL COPOLYMER

(75) Inventors: Toru Arai, Tokyo (JP); Toshiaki Otsu, Tokyo (JP); Masataka Nakajima, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/477,548

(22) PCT Filed: May 15, 2002

(86) PCT No.: PCT/JP02/04711

§ 371 (c)(1),
(2), (4) Date: Nov. 13, 2003

(87) PCT Pub. No.: WO02/102862

PCT Pub. Date: Dec. 27, 2002

(65) Prior Publication Data

US 2004/0102588 A1    May 27, 2004

(30) Foreign Application Priority Data

May 15, 2001    (JP) ............................. 2001-144266

(51) Int. Cl.
C08F 212/02    (2006.01)
(52) U.S. Cl. ........................... 526/347; 526/73; 526/87
(58) Field of Classification Search ................. 526/73, 526/87, 347
See application file for complete search history.

(56) References Cited

U.S. PATENT DOCUMENTS

| | | |
|---|---|---|
| 5,608,009 A | 3/1997 | Machida et al. |
| 5,869,591 A | 2/1999 | McKay et al. |
| 5,883,213 A | 3/1999 | Arai et al. |
| 6,066,709 A | 5/2000 | Arai et al. |
| 6,147,180 A | 11/2000 | Markel et al. |
| 6,166,145 A | 12/2000 | Guest et al. |
| 6,235,855 B1 | 5/2001 | Arai et al. |
| 6,248,850 B1 | 6/2001 | Arai |
| 6,319,577 B1 | 11/2001 | Guest et al. |
| 6,329,479 B1 | 12/2001 | Arai et al. |
| 6,348,556 B1 | 2/2002 | Arai et al. |
| 6,410,649 B1 | 6/2002 | Oda et al. |
| 6,410,673 B1 | 6/2002 | Arai et al. |
| 6,417,308 B1 | 7/2002 | Arai et al. |
| 6,472,490 B1 | 10/2002 | Arai et al. |
| 6,489,424 B1 | 12/2002 | Arai et al. |
| 6,552,148 B1 | 4/2003 | Cheung et al. |
| 6,559,234 B1 | 5/2003 | Arai et al. |
| 6,566,453 B1 | 5/2003 | Arai et al. |
| 6,630,215 B1 | 10/2003 | Oda et al. |
| 2003/0120012 A1 | 6/2003 | Cheung et al. |

FOREIGN PATENT DOCUMENTS

| | | |
|---|---|---|
| EP | 09 23 617 | 6/1999 |
| EP | 970976 | 1/2000 |
| JP | 3-163088 | 7/1991 |
| JP | 6-49132 | 2/1994 |
| JP | 7-53618 | 2/1995 |
| JP | 9-309925 | 12/1997 |
| JP | 11-130808 | 5/1999 |
| JP | 2000-117914 | 4/2000 |
| JP | 2000-119413 | 4/2000 |
| JP | 2000-230024 | 8/2000 |
| JP | 2000-313724 | 11/2000 |
| WO | WO 98/10015 | 3/1998 |
| WO | WO 98/17721 | 4/1998 |
| WO | WO 00/23484 * | 4/2000 |
| WO | WO 00/49059 | 8/2000 |
| WO | WO 02/072692 | 9/2002 |

OTHER PUBLICATIONS

Sernetz et al, Copolymerization of Ethene with Styrene Using Different Methylaluminoxane Activated Half-Sandwich Complexe J. Polymer Science Part A: Polym. Chem., vol. 35, No. 8, 1571-78 (1997).*

Chung et al, Synthesis of Poly(ethylene-co-methystyrene) Copolymers by Metallocene Catalysts with Constrained Ligand Geometry, J. Polymer Science Part A: Polym. Chem.: vol. 35, 575-579 (1997).*

(Continued)

Primary Examiner—Fred Teskin
(74) Attorney, Agent, or Firm—Oblon, Spivak, McClelland, Maier & Neustadt, P.C.

(57) ABSTRACT

An olefin/aromatic vinyl compound copolymer which is excellent in transparency and which satisfies flexibility and heat resistance simultaneously can be produced by carrying out polymerization in such a manner that at least one of conditions: (a) the polymerization is carried out to an aromatic vinyl compound monomer conversion ratio of at least 50 mol % when the polymerization is completed, and (b) the polymer concentration is at least 10 mass % relative to the polymerization solution when the polymerization is completed, is satisfied, and the olefin partial pressure is changed so that the olefin partial pressure when the polymerization is completed is from 1.3 to 20 times the olefin partial pressure at the initiation of the polymerization.

32 Claims, 4 Drawing Sheets

OTHER PUBLICATIONS

U.S. Appl. No. 09/588,579, filed Jun. 7, 2000, Arai et al.
U.S. Appl. No. 09/581,247, filed Jun. 26, 2000, Arai et al.
U.S. Appl. No. 09/926,523, filed Nov. 14, 2001, Arai et al.
U.S. Appl. No. 10/078,668, filed Feb. 21, 2002, Arai et al.
U.S. Appl. No. 10/246, 641, filed Sep. 19, 2002, Arai et al.
U.S. Appl. No. 10/477,548, filed Nov. 13, 2003, Arai et al.
U.S. Appl. No. 10/759,084, filed Jan. 20, 2004, Arai et al.
U.S. Appl. No. 10/486,242, filed Feb. 9, 2004, Arai et al.

* cited by examiner

Fig.1

Relation between composition and melting point

▲ Comparative Example
● Example
— Polynomial (Comparative Example)

PROCESS FOR PRODUCING OLEFIN/AROMATIC VINYL COPOLYMER

TECHNICAL FIELD

The present invention relates to a novel process for producing an olefin/aromatic vinyl compound copolymer and an olefin/aromatic vinyl compound copolymer having excellent properties obtained by the process.

BACKGROUND ART

Ethylene/Aromatic Vinyl Compound (Styrene) Copolymers

Some ethylene/aromatic vinyl compound (styrene) random copolymers obtainable by means of a so-called homogeneous Ziegler-Natta catalyst system comprising a transition metal catalyst component and an organic aluminum compound, and processes for their production, are known.

JP-A-3-163088 and JP-A-7-53618 disclose ethylene/styrene copolymers having a styrene content of at most 50 mol % and containing regular (i.e. head-to-tail) styrene chain, so-called pseudo-random copolymers, obtainable by means of a complex having a so-called constrained geometric structure.

JP-A-6-49132 and Polymer Preprints, Japan, 42, 2292 (1993) disclose processes for producing similar ethylene/styrene copolymers having an aromatic vinyl compound content of at most 50 mol % and containing regular aromatic vinyl compound chain, so-called pseudo-random copolymers, by means of a catalyst comprising a bridged metallocene type Zr complex and a cocatalyst. These copolymers have no stereoregularity derived from aromatic vinyl compound units.

Further, recently, it has been reported to produce an ethylene/aromatic vinyl compound copolymer having a stereoregularity of alternating copolymerization type by means of a certain specific bridged bisindenyl type Zr complex i.e. a racemic[ethylenebis(indenyl)zirconium dichloride] under an extremely low temperature (−25° C.) condition. (Macromol. Chem., Rapid Commun., 17, 745 (1996).) However, with the copolymer obtainable by this complex, the molecular weight is not yet practically sufficient, and the compositional distribution is also large.

Further, JP-A-9-309925 and JP-A-11-130808 disclose novel high-molecular weight ethylene/styrene copolymers which respectively have styrene contents of from 1 to 55 mol % and from 1 to 99 mol % and which have ethylene/styrene alternating structures and isotactic stereoregularity in their styrene chain structures and further have head-to-tail styrene chain structures, with the alternating degrees (λ values in this specification) of the copolymers being at most 70. Further, these copolymers have relatively high transparency.

However, it has been understood that transparency of these copolymers decreases if they have a certain extent of compositional distribution. If transparency decreases, application to use for which high transparency is required, such as alternative to soft vinyl chloride resins is difficult in some cases.

Such copolymers have a relatively high melting point (heat resistance) at a low styrene content compositional region, but have high hardness, and they will hardly be employed for use as soft resins. Hardness can be decreased by increasing the styrene content, but the melting point decreases, and heat resistance will be impaired.

As mentioned above, conventional ethylene/styrene copolymers can hardly satisfy heat resistance and flexibility simultaneously.

The present invention is to overcome the above problems of conventional technique, and to provide a process for producing an olefin/aromatic vinyl compound copolymer which is excellent in transparency and which satisfies flexibility and heat resistance simultaneously with a practically high productivity.

DISCLOSURE OF THE INVENTION

The present inventors have found that a copolymer having high transparency can be obtained surprisingly under a polymerization condition with a high conversion ratio of an aromatic vinyl compound and under a polymerization condition under which the olefin partial pressure varies, i.e. under a polymerization condition under which the compositional distribution of the copolymer is considered to be large, and found that the heat resistance improves while flexibility is maintained, and accomplished the present invention. Further, problems such as gelation, a decrease in moldability or complexity of the process can be avoided, since no diene, divinyl benzene or the like is employed as a comonomer component.

BEST MODE FOR CARRYING OUT THE INVENTION

In the present invention, the olefin/aromatic vinyl compound copolymer is a copolymer comprising units derived from an olefin and an aromatic vinyl compound.

In the present specification, the aromatic vinyl compound content of the copolymer is the content of units derived from the aromatic vinyl compound monomer contained in the copolymer. The same applies to the olefin content.

The olefin/aromatic vinyl compound copolymer having favorable transparency and having both flexibility and heat resistance of the present invention, can be obtained by copolymerizing an olefin monomer and an aromatic vinyl compound monomer in such a manner that (1) at least one of conditions (a) the conversion ratio of the aromatic vinyl compound monomer is at least 50 mol % when the polymerization is completed, and (b) the polymer concentration is at least 10 mass % relative to the polymerization solution when the polymerization is completed, is satisfied, and (2) the olefin partial pressure is changed during the polymerization so that the olefin partial pressure when the polymerization is completed is from 1.3 to 20 times the olefin partial pressure at the initiation of the polymerization.

Preferably, the olefin/aromatic vinyl compound copolymer having favorable transparency and having both flexibility and heat resistance of the present invention can be obtained by copolymerizing an olefin monomer and an aromatic vinyl compound monomer in such a manner that conditions such that the conversion ratio of the aromatic vinyl compound monomer is at least 50 mol % when the polymerization is completed, and that the polymer concentration is at least 10 mass % relative to the polymerization solution when the polymerization is completed, are satisfied, and the olefin partial pressure is changed during the polymerization so that the olefin partial pressure when the polymerization is completed is from 1.3 to 20 times the olefin partial pressure at the initiation of the polymerization.

The conversion ratio of the aromatic vinyl compound monomer is the proportion of the amount (number of mols) of the finally copolymerized aromatic vinyl compound monomer to the amount (number of mols) of the aromatic vinyl compound monomer used for polymerization.

The polymer concentration when the polymerization is completed is the proportion (mass %) of the mass of the obtained polymer to the polymerization solution.

The olefin to be used in the present invention may be ethylene or a $C_{3-20}$ α-olefin, such as propylene, 1-butene, 1-hexene, 4-methyl-1-pentene or 1-octene, or a $C_{5-20}$ cyclic olefin, such as cyclopentene or norbornene. Preferably an α-olefin such as ethylene, propylene, 1-butene, 1-hexene or 1-octene may be used, and more preferably ethylene is employed.

Further, a plurality of olefins may be employed. In such a case, preferred is a combination of ethylene with an α-olefin other than ethylene.

As the aromatic vinyl compound, preferably styrene is employed.

However, an aromatic vinyl compound having from 1 to 5 halogen substituent(s) such as p-chlorostyrene or an aromatic vinyl compound having from 1 to 5 $C_{1-10}$ hydrocarbon substituent(s) such as p-tert-butylstyrene, α-methylstyrene, vinyl naphthalene, p-methylstyrene, vinyl naphthalene or vinyl anthracene may, for example, be employed. Further, a mixture thereof may be employed.

The olefin/aromatic vinyl compound copolymer of the present invention preferably has a composition of an aromatic vinyl compound content within a range of from 1 to 99 mol %.

Particularly, in order to obtain a copolymer having characteristics of a soft vinyl chloride (a feeling such as softness, a tangent δ component in the vicinity of room temperature in the viscoelasticity spectrum), an olefin/aromatic vinyl compound having an aromatic vinyl compound content of from 5 mol % to 50 mol % is suitable.

The olefin/aromatic vinyl compound copolymer of the present invention can be obtained by polymerizing an olefin monomer and an aromatic vinyl compound monomer under the above conditions in the presence of a single site coordination polymerization catalyst, and the single site coordination polymerization catalyst to be used may, for example, be a polymerization catalyst comprising a transition metal compound and a cocatalyst i.e. a soluble Zieglar-Natta catalyst or a transition metal compound catalyst activated with e.g. methyl aluminoxane or a boron compound (a so-called metallocene catalyst or half metallocene catalyst, a CGCT catalyst, etc.).

Specifically, polymerization catalysts disclosed in the following literatures and patents, can be employed.

For example, metallocene catalysts disclosed in U.S. Pat. No. 5,324,800, JP-B-7-37488, JP-A-6-49132, Polymer Preprints, Japan, 42, 2292 (1993), Macromol. Chem., Rapid Commun., 17, 745 (1996), JP-A-9-309925, EP0872492A2 and JP-A-6-184179.

Half metallocene catalysts disclosed in Makromol. Chem. 191, 2387 (1990).

CGCT catalysts disclosed in JP-A-3-163088, JP-A-7-53618, EP-A-416815 and WO/99/14221.

Soluble Zieglar-Natta catalysts disclosed in JP-A-3-250007 and Stud. Surf. Sci. Catal., 517 (1990).

The single site coordination polymerization catalyst is a polymerization catalyst comprising a transition metal compound and a cocatalyst, i.e. a polymerization catalyst comprising a transition metal compound catalyst activated with methyl aluminoxane or a boron compound (a so-called metallocene catalyst or half metallocene catalyst, a CGCT catalyst, etc.).

In the present invention, the single site coordination polymerization catalyst to be most preferably employed, is a polymerization catalyst comprising a transition metal compound represented by the following general formula (1) and a cocatalyst.

When a polymerization catalyst comprising a transition metal compound represented by the following general formula (1) and a cocatalyst, is employed, an olefin/aromatic vinyl compound copolymer with an extremely high activity can be produced. Further, it is possible to copolymerize the aromatic vinyl compound monomer in the polymer with a high efficiency. Such characteristics are important to effectively carry out the polymerization until a conversion ratio of the aromatic vinyl compound of at least 50% is achieved. Further, such is significant from such a viewpoint that a high activity can be maintained, and the polymerization can be carried out in a short period of time suitable for industrialization. The polymerization catalyst comprising a transition metal compound and a cocatalyst employed in the present invention is characterized in that it provides a copolymer having relatively favorable transparency even if polymerization is carried out under a normal condition, i.e. under a constant olefin partial pressure with a conversion ratio of the aromatic vinyl compound of less than 50%.

Further, an olefin/aromatic vinyl compound copolymer excellent in mechanical properties, having an isotactic stereoregularity and a head-to-tail styrene chain structure, can be presented.

General Formula (1)

wherein each of A and B which are independent of each other, is a group selected from an unsubstituted or substituted benzoindenyl group, an unsubstituted or substituted cyclopentadienyl group, an unsubstituted or substituted indenyl group, and an unsubstituted or substituted fluorenyl group;

Y is a methylene group, a silylene group, an ethylene group, a germilene group or a boron residue, which has bonds to A and B and which further has hydrogen or a group containing a $C_{1-20}$ hydrocarbon (this group may contain from 1 to 3 nitrogen, boron, silicon, phosphorus, selenium, oxygen or sulfur atom(s)), as substituents, the substituents may be the same or different from one another, and Y may have a cyclic structure such as a cyclohexylidene group or a cyclopentylidene group;

each X is independently hydrogen, a halogen, a $C_{1-15}$ alkyl group, a $C_{3-20}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amide group or an amino group having hydrogen or a $C_{1-22}$ hydrocarbon substituent, and n is an integer of 0, 1 or 2, provided that when n is 2, the plurality of X's may have a bond to each other; and

M is zirconium, hafnium or titanium.

Particularly preferred is a polymerization catalyst comprising a transition metal compound of the above general formula (1) wherein at least one of A and B is an unsubstituted or substituted benzoindenyl group or an unsubstituted or substituted indenyl group, and a cocatalyst.

The unsubstituted or substituted benzoindenyl group can be represented by the following formulae 3 to 5.

In the following chemical formulae, each of R1b to R3b which are independent of one another, is hydrogen or a substituent consisting of a halogen, a hydroxyl group, an amine group or a $C_{1-20}$ hydrocarbon group. In a case of a hydrocarbon group, it may contain from 1 to 3 halogen atom(s), silicone atom(s), phosphorus atom(s), oxygen atom(s), boron atoms(s), nitrogen atom(s), sulfur atom(s) or selenium atom(s), and it may have a structure of a $OSiR_3$ group, a $SiR_3$ group, a $NR_2$ group, a $OH$ group, a $OR$ group or a $PR_2$ group (R is a $C_{1-10}$ hydrocarbon group). Further, in a case of a hydrocarbon group, preferred is a $C_{1-20}$ alkyl group, a $C_{3-20}$ alkenyl group, a $C_{6-20}$ aryl group or a $C_{7-20}$ alkylaryl group. These R1b's, R2b's or R3b's may be the same or different. Further, adjacent such groups may together form a single or plural 5- to 10-membered aromatic or alicyclic rings.

Further, each of R1a to R3a which are independent of one another, is hydrogen, or a substituent consisting of a halogen, a hydroxyl group, an amine group or a $C_{1-20}$ hydrocarbon group. In a case of a hydrocarbon group, it may contain from 1 to 3 halogen atom(s), silicon atom(s), phosphorus atom(s), oxygen atom(s), boron atom(s), nitrogen atom(s), sulfur atom(s) or selenium atom(s), and it may have a structure of a $OSiR_3$ group, a $SiR_3$ group, a $NR_2$ group, a $OH$ group, a $OR$ group or a $PR_2$ group (R is a $C_{1-10}$ hydrocarbon group). Further, in a case of a hydrocarbon group, preferred is a $C_{1-20}$ alkyl group, a $C_{3-20}$ alkenyl group, a $C_{6-20}$ aryl group or a $C_{7-20}$ alkylaryl group. The R1a's, R2a's or R3a's may be the same or different. However, each of R1a to R3a is preferably hydrogen.

Formula 3

Formula 4

Formula 5

The unsubstituted benzoindenyl group may, for example, be 4,5-benzo-1-indenyl (another name: benzo(e)indenyl), 5,6-benzo-1-indenyl or 6,7-benzo-1-indenyl, and the substituted benzoindenyl group, may, for example, be α-acenaphtho-1-indenyl, 3-cyclopenta[c]phenanthryl, or 1-cyclopenta[1]phenanthryl.

Particularly preferably, the unsubstituted benzoindenyl group is 4,5-benzo-1-indenyl (another name: benzo(e)indenyl), and the substituted benzoindenyl group may, for example, be α-acenaphtho-1-indenyl, 3-cyclopenta[c]phenanthryl or 1-cyclopenta[1]phenanthryl.

The unsubstituted or substituted indenyl group, the unsubstituted or substituted fluorenyl group, and the unsubstituted or substituted cyclopentadienyl group may be represented by the formulae 6 to 8.

Formula 6

Formula 7

Formula 8

Each of R4b, R5 and R6 which are independent of each other, is hydrogen or a substituent consisting of a halogen, a hydroxyl group, an amine group or a $C_{1-20}$ hydrocarbon group. In a case of a hydrocarbon group, it may contain from 1 to 3 halogen atom(s), silicon atom(s), phosphorus atom(s), oxygen atom(s), boron atom(s), nitrogen atom(s), sulfur atom(s) or selenium atom(s), and it may have a structure of a $OSiR_3$ group, a $SiR_3$ group, a $NR_2$ group, a $OH$ group, a $OR$ group or a $PR_2$ group (R is a $C_{1-10}$ hydrocarbon group). Further, in a case of a hydrocarbon group, preferred is a $C_{1-20}$ alkyl group, a $C_{3-20}$ alkenyl group, a $C_{6-20}$ aryl group or a $C_{7-20}$ alkylaryl group. R4b's, R5's or R6's may be the same or different. Further, adjacent such groups may together form a single or plural 5- to 10-membered (excluding a case of a 6-membered aromatic ring) aromatic or alicyclic rings.

Further, each R4a is independently hydrogen or a substituent consisting of a halogen, a hydroxyl group, an amine group or a $C_{1-20}$ hydrocarbon group. In a case of a hydrocarbon group, it may contain from 1 to 3 halogen atom(s), silicon atom(s), phosphorus atom(s), oxygen atom(s), boron atom(s), nitrogen atom(s), sulfur atom(s) or selenium atom(s), and it may have a structure of a $OSiR_3$ group, a $SiR_3$ group, a $NR_2$ group, a OH group, a OR group or a $PR_2$ group (R is a $C_{1-10}$ hydrocarbon group). Further, in a case of a hydrocarbon group, preferred is a $C_{1-20}$ alkyl group, a $C_{3-20}$ alkenyl group, a $C_{6-20}$ aryl group or a $C_{7-20}$ alkylaryl group. R4a's may be the same or different. However, each R4a is preferably hydrogen.

When both A and B are an unsubstituted or substituted benzoindenyl group, or an unsubstituted or substituted indenyl group, they may be the same or different.

For the production of a copolymer to be used in the present invention, it is particularly preferred that at least one of A and B is an unsubstituted or substituted benzoindenyl group.

Further, it is most preferred that both are an unsubstituted or substituted benzoindenyl group.

In the above general formula (1), Y is a methylene group, a silylene group, an ethylene group, a germilene group or a boron residue, which has bonds to A and B and which further has hydrogen or a group containing a $C_{1-20}$ hydrocarbon (this group may contain from 1 to 3 nitrogen, boron, silicon, phosphorus, selenium, oxygen or sulfur atom(s)), as substituents. The substituents may be the same or different from one another. Further, Y may have a cyclic structure such as a cyclohexylidene group or a cyclopentylidene group.

Preferably, Y is a substituted methylene group or a substituted boron group, which has bonds to A and B and which is substituted by hydrogen, a $C_{1-20}$ hydrocarbon group, an amino group or a trimethylsilyl group. More preferably, Y is a substituted methylene group, which has bonds to A and B and which is substituted by hydrogen or a $C_{1-20}$ hydrocarbon group.

The hydrocarbon substituent may, for example, be an alkyl group, an aryl group, a cycloalkyl group or a cycloaryl group. The substituents may be the same or different from one another.

As preferred examples, Y is, for example, —$CH_2$—, —$CMe_2$-, —$CEt_2$-, —$CPh_2$-, a cyclohexylidene group or a cyclopentylidene group. Here, Me represents a methyl group, Et an ethyl group, and Ph a phenyl group.

Each X is independently hydrogen, a halogen, a $C_{1-15}$ alkyl group, a $C_{3-20}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amide group or an amino group, which has hydrogen or a $C_{1-22}$ hydrocarbon substituent, and n is an integer of 0, 1 or 2. When n is 2, the two X's may have a bond to each other.

The halogen may, for example, be chlorine, bromine or fluorine, the alkyl group may, for example, be a methyl group or an ethyl group, the aryl group may, for example, be a phenyl group, the alkylaryl group may, for example, be a benzyl group, the silyl group may, for example, be a trimethylsilyl group, the alkoxy group may, for example, be a methoxy group, an ethoxy group or an isopropoxy group, and the amide group may, for example, be a dialkylamide group such as a dimethylamide group, or an aryl amide group such as N-methyl anilide, N-phenyl anilide or an anilide group. Further, as X, the groups disclosed in U.S. Pat. No. 5,859,276 and U.S. Pat. No. 5,892,075 may be employed.

M is zirconium, hafnium or titanium, particularly preferably zirconium.

As examples of such a transition metal compound, the transition metal compounds disclosed in EP-0872492A2, JP-A-11-130808, JP-A-9-309925, WO00/20426, EP-0985689A2 and JP-A-6-184179, may be mentioned.

Particularly preferred are transition metal compounds having a substituted methylene-bridged structure, as specifically disclosed in EP-0872492A2, JP-A-11-130808 and JP-A-9-309925.

As the cocatalyst to be used in the process of the present invention, a known cocatalyst used in combination with a conventional transition metal compound, or an alkyl aluminum compound may be used. As such a cocatalyst, methyl aluminoxane (or may be referred to as methyl alumoxane or MAO) or a boron compound is suitably employed. As examples of the cocatalyst or the alkyl aluminum compound to be used, the cocatalysts or the alkyl aluminum compounds disclosed in EP-0872492A2, JP-A-11-130808, JP-A-9-309925, WO00/20426, EP-0985689A2 or JP-A-6-184179, may be mentioned.

Further, the cocatalyst to be used at that time, is preferably an aluminoxane (or may be referred to as an alumoxane) represented by the following general formula (2) or (3).

General Formula (2)

wherein R is a $C_{1-5}$ alkyl group, a $C_{6-10}$ aryl group or hydrogen, and m is an integer of from 2 to 100. The plurality of R may be the same or different from one another.

General Formula (3)

wherein R' is a $C_{1-5}$ alkyl group, a $C_{6-10}$ aryl group or hydrogen, and n is an integer of from 2 to 100. The plurality of R' may be the same or different from one another.

At the time of producing an olefin/aromatic vinyl compound copolymer to be used in the present invention, the above described various monomers, the metal complex (the transition metal compound) and the cocatalyst are brought in contact with one another. With respect to the order of contact and the contacting method, optional known methods may be employed.

The above copolymerization or polymerization method may, for example, be a method of polymerizing in a liquid monomer without using a solvent, or a method of employing a single solvent or a mixed solvent selected from a saturated aliphatic or aromatic hydrocarbon and a halogenated hydrocarbon, such as pentane, hexane, heptane, cyclohexane, benzene, toluene, ethylbenzene, xylene, chloro-substituted benzene, chloro-substituted toluene, methylene chloride and chloroform. Preferably, a mixed alkane type solvent, cyclohexane, toluene or ethylbenzene is employed. The polymerization mode may be solution polymerization or slurry polymerization.

For this process, an optional conventional method may be employed. For example, a method by completely mixed type batch polymerization or plug flow polymerization may be mentioned. Here, completely mixed type polymerization is a known method wherein, for example, a tank-form, a power-form or loop-form reactor is employed, and it is a polymerization method wherein in the reactor, the polymerization solution is stirred and mixed relatively well to have a substantially uniform composition. Further, plug flow polymerization is a polymerization method wherein in the reactor, mass transfer is restricted, and the polymerization solution has a continues or non-continues compositional distribution from the inlet towards the outlet of the reactor. In a case where the viscosity of the polymerization solution increases, preferred is a polymerization means of a loop type or a plug flow type having a pipe-form equipped with various cooling means and mixing means, from the viewpoint to carry out heat removal efficiently. In such a case, a batch type preliminary polymerization tank may be equipped. In any case, it is important that the conversion ratio of the aromatic vinyl compound monomer when the polymerization is completed is at least 50 mol %, preferably at least 60 mol %, most preferably at least 65 mol %.

The temperature for polymerization is suitably from −78° C. to 200° C. A polymerization temperature lower than −78° C., is industrially disadvantageous, and if it exceeds 200° C., decomposition of the metal complex tends to take place, such being undesirable. Industrially more preferably, it is from 30° C. to 160° C., particularly preferably from 30° C. to 160° C.

The pressure during the polymerization is usually from 0.1 atm to 1000 atm, preferably from 1 to 100 atm, particularly industrially preferably from 1 to 30 atm.

When alumoxane (or aluminoxane) is used as a cocatalyst, it is used in a ratio to the metal of the complex of from 0.1 to 100,000, preferably from 10 to 10,000, by a ratio of aluminum atom/complex metal atom. If the ratio is smaller than 0.1, the metal complex cannot effectively be activated, and if it exceeds 100,000, such being economically disadvantageous.

When a boron compound is used as a cocatalyst, it is used in a ratio of from 0.01 to 100, preferably from 0.1 to 10, particularly preferably 1, by a ratio of boron atom/complex metal atom.

If the ratio is smaller than 0.01, the transition metal complex cannot effectively be activated, and if it exceeds 100, such being economically disadvantageous.

The metal complex and the cocatalyst may be mixed and prepared outside the polymerization tank, or may be mixed in the tank at the time of polymerization.

In order to produce the olefin/aromatic vinyl compound copolymer having favorable transparency and having both flexibility and heat resistance, the following conditions have to be satisfied.

(1) The polymerization is carried out in such a manner that at least one of conditions (a) the conversion ratio of the used aromatic vinyl compound monomer is at least 50 mol %, preferably at least 60 mol %, most preferably at least 65 mol % when the polymerization is completed, and (b) the polymer concentration is at least 10 mass %, preferably at least 15 mass %, relative to the polymerization solution when the polymerization is completed, is satisfied, and (2) the olefin partial pressure is changed during the polymerization so that the olefin partial pressure when the polymerization is completed is from 1.3 to 20 times, preferably from 1.5 to 20 times, the olefin partial pressure at the initiation of the polymerization.

Preferably, all the following conditions are satisfied.

The polymerization is carried out in such a manner that the conversion ratio of the used aromatic vinyl compound monomer when the polymerization is completed is at least 50 mol %, preferably at least 60 mol %, most preferably at least 65 mol %, the polymer concentration when the polymerization is completed is at least 10 mass %, preferably at least 15 mass %, relative to the polymerization solution, and the olefin partial pressure is changed during the polymerization so that the olefin partial pressure when the polymerization is completed is from 1.3 to 20 times, preferably from 1.5 to 20 times, the olefin partial pressure at the initiation of the polymerization.

The olefin partial pressure may be changed continuously or discontinuously (stepwisely), but the change of the olefin partial pressure which satisfies the condition is carried out over a period of preferably at least 5%, particularly preferably at least 20%, of the total polymerization time. For example, in a case where the total polymerization time is 100 minutes, the olefin partial pressure at the initiation of the polymerization is 0.5 MPa and the olefin partial pressure when the polymerization is completed is 1.0 MPa, the change of pressure from 0.5 MPa at the initiation to final 1.0 MPa is carried out over a period of preferably at least 5 minutes, particularly preferably at least 20 minutes. Such a polymerization condition may be referred to as "gradient olefin (ethylene) pressure condition". If the change of the olefin partial pressure is carried out in a shorter time, i.e. more steeply, transparency of the obtained copolymer may decrease in some cases.

The polymerization temperature may be maintained constant, or may be continuously or discontinuously optionally changed within the above range during the polymerization, but the change of the polymerization temperature during the polymerization is preferably within 70° C.

The catalyst and the cocatalyst may be charged all at once at the initiation of the polymerization, or may be added dividedly during the polymerization. The catalyst or the cocatalyst may optionally be added depending upon the progress of the polymerization during the polymerization.

It is most preferred to employ one type of the polymerization catalyst i.e. the transition metal compound. However, the polymerization may be carried out by employing a plurality of transition metal compounds having different polymerization activity and copolymerization properties.

Olefin/Aromatic Vinyl Compound Copolymer Obtained by the Present Invention

The olefin/aromatic vinyl compound of the preset invention can be synthesized from the respective monomers of an aromatic vinyl compound and an olefin by means of a single site coordination polymerization catalyst in the above polymerization process.

The copolymer of the present invention has such a characteristic that it has favorable transparency and it has both flexibility and heat resistance. Such a copolymer can be obtained by carrying out the polymerization in such a manner that one of conditions that the conversion ratio of the aromatic vinyl compound monomer when the polymerization is completed is at least 50 mol %, preferably at least 60 mol %, and that the polymer concentration when the polymerization is completed is at least 10 mass %, preferably at least 15 mass %, relative to the polymerization solution, is satisfied, and the olefin partial pressure is changed during the polymerization so that the olefin partial pressure when the polymerization is completed is from 1.3 to 20 times the olefin partial pressure at the initiation of the polymerization. The olefin partial pressure may be changed continuously or discontinuously (stepwisely).

The above polymerization condition ("gradient olefin (ethylene) pressure condition") brings about a remarkable change of the olefin monomer/aromatic vinyl compound monomer ratio in the polymerization solution at the initiation and completion of the polymerization. The copolymer obtained under such a condition is considered to be a copolymer having a significant and continuous compositional distribution (a copolymer having a gradient composition).

However, the copolymer obtained by the present invention may provide a high transparency, i.e. a total light transmittance of at least 80% in a form of a molded product of 1 mm in thickness, and a haze of at most 15%.

Further, the present invention provides an ethylene/aromatic vinyl compound copolymer which satisfies the following formula regarding the A hardness and the melting point, which has crystallinity derived from the ethylene chain (polyethylene crystallinity) and which has at least one melting point with a heat of crystal fusion of from 10 J/g to 150 J/g as measured by DSC. The crystallinity due to the ethylene chain can be confirmed, for example, by X-ray diffraction of the polymer.

The copolymer obtained by the present invention is characterized in that the A hardness and at least one melting point among melting points with a heat of crystal fusion of from 10 J/g to 150 J/g as measured by DSC, satisfy the following relation:

$A \leq Tm \leq 120$ $70 \leq A \leq 88$

Tm: at least one melting point (° C.) with a heat of crystal fusion of from 10 J/g to 150 J/g as measured by DSC.

A: A hardness (type A durometer hardness as measured in accordance with the testing method for durometer hardness of plastics in JIS K-7215: instantaneous value)

More preferably, the copolymer obtained by the present invention has at least one melting point with a heat of crystal fusion of from 10 J/g to 150 J/g as measured by DSC, and the copolymer is characterized in that the melting point and the A hardness satisfy the following relation:

$A \leq Tm \leq 105$ $75 \leq A \leq 88$

Tm: at least one melting point (° C.) with a heat of crystal fusion of from 10 J/g to 150 J/g as measured by DSC.

A: A hardness (type A durometer hardness obtained in accordance with testing method for durometer hardness of plastics in JIS K-7215: instantaneous value)

Generally, flexibilization of an olefin (ethylene) type polymer can be achieved by decreasing crystallinity of the polyolefin (polyethylene) by copolymerization of a comonomer. However, decrease in crystallinity brings about a decrease in the melting point (heat resistance) at the same time. Flexibilization and the decease in the melting point by decrease in crystallinity cannot phenomenally independent of each other. Namely, the A hardness (flexibility) and the melting point may satisfy a certain relation with the same olefin species and comonomer species. However, the above relational expression of the melting point and the A hardness shows that the relation of the copolymer of the present invention is significantly outside the relation (i.e. the melting point is relatively high at the same A hardness, or the A hardness is low at the same melting point, as compared with a conventional copolymer).

Further, the copolymer obtained by the present invention has a melting point higher by (at least) about 10° C. as compared with a copolymer having the same composition obtained by a conventional process (a constant olefin partial pressure and an aromatic vinyl compound monomer conversion ratio of less than 50%).

The copolymer obtained by the present invention is characterized in that the composition (aromatic vinyl compound content) and at least one melting point among melting points with a heat of crystal fusion of from 10 J/g to 150 J/g as measured by DSC satisfy the following relation:

$-3 \cdot St + 120 \leq Tm \leq 120$ $(5 \leq St \leq 15)$ $75 < Tm \leq 120$ $(15 < St \leq 50)$ Tm: melting point (° C.) with a heat of crystal fusion of from 10 J/g to 150 J/g as measured by DSC St: Aromatic vinyl compound content (mol %)

More preferably, the copolymer obtained by the present invention has such a characteristic that the composition (aromatic vinyl compound content) and at least one melting point among melting points with a heat of crystal fusion of from 10 J/g to 150 J/g as measured by DSC satisfy the following relation.

$-3 \cdot St + 120 \leq Tm \leq 120$ $(5 \leq St \leq 15)$

Tm: melting point (° C.) with a heat of crystal fusion of from 10 J/g to 150 J/g as measured by DSC St: aromatic vinyl compound content (mol %)

Further, the present invention provides an ethylene/aromatic vinyl compound copolymer having a ratio of MFR measured at a measurement temperature of 230° C. at loads of 10 kg and 2 kg ($I_{10}/I_2$) of from 10 to 50. It is found that the present copolymer has excellent moldability by having such a characteristic.

Further, the present invention provides an olefin/aromatic vinyl compound copolymer which satisfies the above MFR ratio, and which has a molecular weight distribution (Mw/Mn) of from 2 to 6, as obtained by GPC (gel permeation chromatography) measurement employing RI (differential refractive index meter) as a detector employing o-dichlorobenzene as a measurement solvent at a measurement temperature of 145° C.

Now, a representative and preferred ethylene/styrene copolymer will be explained.

The suitable ethylene/styrene copolymer obtained by the present invention has a head-to-tail styrene chain structure. Further, it preferably has a chain structure of head-to-tail styrene units attributable to peaks observed at from 40 to 45 ppm by the $^{13}C$-NMR measurement based on TMS. Further, it preferably has a chain structure of styrene units attributable to peaks observed at from 42.3 to 43.1 ppm, 43.7 to 44.5 ppm, 40.4 to 41.0, ppm and from 43.0 to 43.6 ppm.

Further, the preferred copolymer obtained by the present invention is an ethylene/styrene copolymer obtained by means of a metallocene catalyst capable of producing an isotactic polystyrene by homopolymerization of styrene, and is an ethylene/styrene copolymer obtained by means of a metallocene catalyst capable of producing polyethylene by homopolymerization of ethylene.

Therefore, the obtained ethylene/styrene copolymer may have ethylene chain structures, head-to-tail styrene chain structures and structures having ethylene units and styrene units bonded, in its main chain.

The suitable ethylene/styrene copolymer obtained by the present invention may have a head-to-tail styrene chain structure in its structure.

Further, the preferred ethylene/styrene copolymer obtained by the present invention may have isotactic stereoregularity in the ethylene/styrene alternating structure and/or the styrene chain structure.

The details of the styrene chain structure and the stereoregularity are disclosed in JP-A-9-309925, EP0872492A2 and JP-A-11-130808.

The above-described preferred olefin/aromatic vinyl compound copolymer obtained by the present invention, particularly ethylene/styrene copolymer can be obtained by a polymerization catalyst comprising a transition metal compound represented by the above general formula (1) and a cocatalyst.

Explanation is made on the ethylene/styrene copolymer as a representative and preferred example of the olefin/aromatic vinyl compound copolymer obtained by the present invention, however, the olefin/aromatic vinyl compound copolymer obtained by the present invention is not limited thereto.

The weight average molecular weight of the olefin/aromatic vinyl compound copolymer obtained by the present invention is at least 10,000, preferably at least 30,000, particularly preferably at least 60,000, and at most 1,000,000, preferably at most 500,000. The molecular weight distribution (Mw/Mn) is from 2 to 30, preferably from 2 to 10, particularly preferably from 2 to 6.

The weight average molecular weight is the molecular weight as calculated as polystyrene, as obtained by GPC (gel permeation chromatography) measurement employing RI detector employing o-dichlorobenzene as a measurement solvent at a measurement temperature of 145° C. The same applies hereinafter.

The weight average molecular weight of the olefin/aromatic vinyl compound copolymer obtained by the present invention may be adjusted within the above range by a known method employing a chain transfer agent such as hydrogen or by changing the polymerization temperature as the case requires.

The copolymer obtained by the present invention may have a partially branched structure or crosslinked structure.

Now, physical properties and the application of the ethylene/styrene copolymer as a representative example of the olefin/aromatic vinyl compound copolymer of the present invention will be described below.

The ethylene/styrene copolymer of the present invention may be used alone and can suitably be employed as a substitute for a known transparent soft resin such as soft polyvinyl chloride.

To the copolymer of the present invention, a stabilizer, an aging-preventing agent, a light resistance-improving agent, an ultraviolet absorber, a plasticizer, a softening agent, a lubricant, a processing adjuvant, a colorant, an antistatic agent, an anti-fogging agent, a blocking-preventing agent, a crystal nucleating agent, etc. which are commonly used for resins, may be incorporated. These additives may be used alone or in combination of a plurality of them.

By virtue of the excellent characteristics, the copolymer of the present invention is used alone or as a composition containing it as the main component and can be suitably used for a stretch film, a shrink film, a packaging material, a sheet, a tube or a hose as a substitute for a known transparent soft resin such as soft polyvinyl chloride.

Application to Films

In a case where the copolymer of the present invention is used as a film or a stretch packaging film, the thickness is not particularly limited, but it is usually from 3 μm to 1 mm, preferably from 10 μm to 0.5 mm. To suitably use it as a stretch packaging film for foods, the thickness is preferably from 5 to 100 μm, more preferably from 10 to 50 μm.

For the production of a transparent film or a stretch packaging film made of the copolymer of the present invention, a common extrusion film-forming method such as an inflation system or a T-die system, may be employed. For the purpose of improving the physical properties, the film or the stretch packaging film of the present invention may be laminated with other suitable film, for example, a film of e.g. isotactic or syndiotactic polypropylene, high density polyethylene, low density polyethylene (LDPE or LLDPE), polystyrene, polyethylene terephthalate or an ethylene/vinyl acetate copolymer (EVA).

Further, the film or the stretch packaging film of the present invention may have self-tackiness or an adhesive property. However, if a stronger self-tackiness is required, it may be laminated with other film having self-tackiness to obtain a multi-layered film.

Specific applications of the film of the present invention are not particularly limited, but it is useful as a general packaging material or a container and can be used for e.g. a packaging film, a bag or a pouch. Especially, it can suitably be used as a stretch packaging film or a pallet stretching film for food packaging.

To the molded product, particularly the film or the stretch packaging film, of the present invention, surface treatment with e.g. corona, ozone or plasma, coating with an anti-fogging agent, coating with a lubricant or printing, may be applied, as the case requires.

Among molded products of the present invention, the film or the stretch packaging film may be prepared as a monoaxially or biaxially stretched film, as the case requires.

The film or the stretch packaging film of the present invention may be bonded to the film itself or to a material such as other thermoplastic resin by fusion by means of e.g. heat, supersonic waves, high frequency wave or by bonding by means of e.g. a solvent.

Further, when used as a stretch packaging film for foods, it can be suitably packaged by an automatic packaging machine or a manual packaging machine.

Further, when the film of the present invention has a thickness of, for example, at least 100 μm, a packaging tray for foods, electrical products, etc., can be molded by a technique of e.g. heat molding such as vacuum molding, compression molding or air-pressure forming.

Further, the copolymer of the present invention basically does not contain an elutable plasticizer or halogen and thus has a basic characteristic that its environmental compatibility or safety is high.

The copolymer of the present invention may be used as a composition with other polymers. Further, it may be used as a composition with a filler or a plasticizer.

Known polymers or additives for the conventional compositions with an ethylene/styrene copolymer, can also be employed for a composition with the copolymer of the present invention. The following may be mentioned as such polymers and additives. The following polymers may be added within a range of from 1 to 99 mass %, preferably from 30 to 95 mass %, based on the composition employing the copolymer of the present invention. Further, the copolymer of the present invention can be used also as a compatibilizing agent for the following "aromatic vinyl compound type polymer" and "olefin type polymer". In this case, the copolymer of the present invention can be used within a range of from 1 to 50 mass %, preferably from 1 to 20 mass %, based on the composition.

Further, in the case of the following "filler" or "plasticizer", it can be used within a range of from 1 to 80 mass %, preferably from 5 to 50 mass %, based on the composition.

Aromatic Vinyl Compound Type Polymer

A homopolymer of an aromatic vinyl compound, and a copolymer of an aromatic vinyl compound with at least one monomer component copolymerizable therewith, wherein the aromatic vinyl compound content is at least 10 mass %, preferably at least 30 mass %. The aromatic vinyl compound monomer to be used for the aromatic vinyl compound type polymer includes styrene and various substituted styrenes such as p-methylstyrene, m-methylstyrene, o-methylstyrene, o-t-butylstyrene, m-t-butylstyrene, p-t-butylstyrene and α-methylstyrene, and further, a compound having a plurality of vinyl groups in one molecule, such as divinylbenzene, may also be mentioned. Further, a copolymer of a plurality of such aromatic vinyl compounds, may also be employed. The stereoregularity among mutual aromatic groups of the aromatic vinyl compound may be atactic, isotactic or syndiotactic.

The monomer copolymerizable with the aromatic vinyl compound includes butadiene, isoprene, other conjugated dienes, acrylic acid, methacrylic acid and amide derivatives or ester derivatives, maleic anhydride and its derivatives. The copolymerization mode may be any one of block copolymerization, tapered block copolymerization, random copolymerization and alternating copolymerization. Further, it may be one having the above aromatic vinyl compound graft-polymerized to a polymer made of the above-mentioned monomers, which contains at least 10 mass %, preferably at least 30 mass %, of the aromatic vinyl compound.

The above aromatic vinyl compound type polymer is required to have a weight average molecular weight of at least 30,000, preferably at least 50,000, as calculated as styrene, in order to show the performance as a practical resin.

The aromatic vinyl compound type resin to be used, may, for example, be isotactic polystyrene (i-PS), syndiotactic polystyrene (s-PS), atactic polystyrene (a-PS), rubber-reinforced polystyrene (HIPS), an acrylonitrile/butadiene/styrene copolymer (ABS) resin, a styrene/acrylonitrile copolymer (AS resin), a styrene/methacrylate copolymer such as a styrene/methyl methacrylate copolymer, a styrene/diene block/tapered copolymer (such as SBS, SIS), a hydrogenated styrene/diene block/tapered copolymer (such as SEBS, SEPS), a styrene/diene copolymer (such as SBR), a hydrogenated styrene/diene copolymer (such as hydrogenated SBR), a styrene/maleic acid copolymer, or a styrene/imidated maleic acid copolymer. Further, it is a concept including a petroleum resin.

Olefin Type Polymer

For example, low density polyethylene (LDPE), high density polyethylene (HDPE), linear low density polyethylene (LLDPE), isotactic polypropylene (i-PP), syndiotactic polypropylene (s-PP), atactic polypropylene (a-PP), a propylene/ethylene block copolymer, a propylene/ethylene random copolymer, an ethylene/propylene/diene copolymer (EPDM), an ethylene/vinyl acetate copolymer, polyisobutene, polybutene, a cyclic olefin polymer such as polynorbornene and a cyclic olefin copolymer such as an ethylene/norbornene copolymer, may be mentioned. It may be an olefin type resin co-polymerized with a diene such as butadiene or α-ω-diene, as the case requires.

The above olefin type polymer is required to have a weight average molecular weight of at least 10,000, preferably at least 30,000, as calculated as styrene, in order to show the performance as a practical resin.

Other Resins, Elastomers and Rubbers

For example, polyamide such as nylon, polyimide, polyester such as polyethylene terephthalate, polyvinyl alcohol, and a styrene type block copolymer such as SBS (styrene/butadiene block copolymer), SEBS (hydrogenated styrene/butadiene block copolymer), SIS (styrene/isoprene block copolymer), SEPS (hydrogenated styrene/isoprene block copolymer), SBR (styrene/butadiene block copolymer) or hydrogenated SBR, which is not in the scope of the above aromatic vinyl compound type resin, natural rubber, a silicone resin, and silicone rubber, may be mentioned.

Fillers

Known fillers may be employed. As preferred examples, calcium carbonate, talc, clay, calcium silicate, magnesium carbonate, magnesium hydroxide, mica, barium sulfate, titanium oxide, aluminum hydroxide, silica, carbon black, wood powder and wood pulp may, for example, be mentioned. Further, glass fibers, known graphites or conductive fillers such as carbon fibers, may also be employed.

Plasticizers

Known plasticizers, such as paraffin type, naphthene type or aroma type process oils, mineral oil type softening agents such as liquid paraffin, castor oil, linseed oil, olefin type wax, mineral type wax and various esters, may be used.

For the production of the polymer composition of the present invention, a suitable known blending method may be employed. For example, melt-mixing can be carried out by means of a single screw or twin screw extruder, a Banbury mixer, a plasto mill, a co-kneader or a heated roll. Prior to the melt mixing, it is advisable to uniformly mix the respective materials by means of e.g. a Henschel mixer, a ribbon blender, a super mixer or a tumbler. The melt mixing temperature is not particularly limited, but it is usually from 100 to 300° C., preferably from 150 to 250° C.

As molding methods for various compositions of the present invention, known molding methods such as vacuum molding, injection molding, blow molding, extrusion molding or profile extrusion molding, may be employed.

The composition containing the copolymer of the present invention can be preferably used as various film or packaging materials, sheets, tubes, hoses, gaskets, and further as building materials such as floor materials or wall materials, or interior materials for automobiles.

EXAMPLES

Now, the present invention will be described with reference to Examples, but the present invention is by no means restricted to the following Examples.

The analyses of copolymers obtained in the respective Examples and Comparative Examples were carried out by the following methods.

The $^{13}$C-NMR spectrum was measured by using TMS as standard, by using a chloroform-d solvent or a 1,1,2,2- tetrachloroethane-d2 solvent, by means of α-500 manufactured by JEOL Ltd. Here, the measurement using TMS as standard is the following measurement. Firstly, using TMS as standard, the shift value of the center peak of triplet $^{13}$C-NMR peaks of 1,1,2,2-tetrachloroethane-d2 was determined. Then, the copolymer was dissolved in 1,1,2,2-tetrachloroethane-d2, and the $^{13}$C-NMR was measured, whereby each peak shift value was calculated, based on the triplet center peak of 1,1,2,2-tetrachloroethane-d2. The shift value of the triplet center peak of 1,1,2,2-tetrachloroethane-d2 was 73.89 ppm. The measurement was carried out by dissolving the polymer in such solvent in an amount of 3 mass/volume %.

The $^{13}$C-NMR spectrum measurement for quantitive analysis of peak areas, was carried out by a proton gate decoupling method having NOE erased, by using pulses with a pulse width of 45° and a repeating time of 5 seconds as standard.

When the measurement was carried out under the same conditions except that the repeating time was changed to 1.5 seconds, the measured values of peak areas of the copolymer agreed to the values obtained in the case where the repeating time was 5 seconds, within measurement error.

The styrene content in the copolymer was determined by $^1$H-NMR. As the apparatus, α-500 manufactured by JEOL Ltd. and AC-250 manufactured by BRUCKER COMPANY, were employed. The determination was carried out at a temperature of from 80 to 100° C. by dissolving a sample in 1,1,2,2-tetrachloroethane-d2 and comparing the intensity of the proton peak attributable to a phenyl group (6.5 to 7.5 ppm) and the proton peak attributable to an alkyl group (0.8 to 3 ppm), measured by using TMS as standard.

Molecular Weight, Molecular Weight Distribution

As the molecular weights in Examples, weight average molecular weights as calculated as standard polystyrene, were obtained by means of GPC (Gel Permeation Chromatography).

A copolymer soluble in THF at room temperature, was measured by means of HLC-8020 manufactured by TOSOH CORPORATION using THF as the solvent. A copolymer insoluble in THF at room temperature, was measured at 145° C. by means of HLC-8121 apparatus manufactured by TOSOH CORPORATION using o-dichlorobenzene as the solvent. As the detector, RI (differential refractive index meter) was used.

With copolymers in Examples, the refractive index to o-dichlorobenzene as the solvent significantly changes as between the polymer chain component formed at the beginning of the polymerization and the polymer chain component obtained at the late stage. Accordingly, the molecular weight and the molecular weight distribution of the copolymer obtained by the RI detector are useful only as indices to define the copolymer of the present invention.

Melting Point, Heat of Crystal Fusion and Glass Transition Point

The DSC measurement was carried out by using DSC 200 manufactured by Seiko Denshi K.K. in a nitrogen stream at a temperature raising rate of 10° C./min. Using 10 mg of a sample, it was heated to 240° C. at a temperature raising rate of 20° C./min and quenched to −100° C. or lower by liquid nitrogen (pretreatment), and then the temperature was raised from −100° C. at a rate of 10° C./min to carry out the DSC measurement up to 240° C., whereby the melting point, the heat of crystal fusion and the glass transition point were obtained. The glass transition point was obtained by a tangent method.

X-ray Diffraction

The X-ray diffraction was measured by MXP-3 model X-ray diffraction apparatus, manufactured by Mac Science Company employing as the ray source a Cu sealed counter cathode (wavelength: 1.5405 Å).

Tensile Test

As a sample for evaluation of the physical properties, a sheet having a thickness of 1.0 mm formed by a heat-pressing method (temperature: 180° C., time: 3 minutes, pressure: 50 kg/cm$^2$) was used. In accordance with JIS K-6251, the sheet was cut into a shape of test piece No. 1, and measured at a tensile speed of 500 mm/min by means of AGS-100D model tensile tester manufactured by Shimadzu Corporation.

Vicat Softening Point

A sheet having a thickness of 4 mm was prepared by a heat pressing method, and a test specimen of 10 mm×10 mm was cut out. In accordance with JIS K-7206, it was measured under a load of 320 g at an initial temperature of 40° C. under a temperature raising condition of 50° C./hr using HDT & VSPT tester S3-FH, manufactured by Toyo Seiki.

Hardness

With respect to the hardness, durometer hardness (instantaneous value) of types A and D at 23° C. was obtained in accordance with testing methods for durometer hardness of plastics as prescribed in JIS K-7215.

Total Light Transmittance, Haze

With respect to the transparency, the total light transmittance and the haze were measured by means of turbidity meter NDH2000, manufactured by Nippon Denshoku Industries Co., Ltd. in accordance with testing methods for optical properties of plastics as prescribed in JIS K-7105 with respect to a sheet having a thickness of 1 mm molded by heat pressing (temperature: 200° C., time: 4 minutes, pressure: 50 kg/cm$^2$G).

MFR

MFR was measured in accordance with JIS K-7215. Measurement was carried out at a measurement temperature of 230° C. at loads of 10 kg and 2 kg, respectively.

In the following Examples, as a catalyst (transition metal compound), the following rac-dimethylmethylenebis(4,5-benzo-1-indenyl)zirconium dichloride (rac-isopropylidenebis(4,5-benzo-1-indenyl)zirconium dichloride) was employed.

Example 1

Preparation of an Ethylene/Styrene Copolymer

Polymerization was carried out by means of an autoclave having a capacity of 10 L and equipped with a stirrer and a jacket for heating and cooling.

4,400 ml of cyclohexane and 400 ml of styrene were charged and heated and stirred at an internal temperature of 50° C. About 200 L of nitrogen was bubbled to purge the interior of the system. 8.4 mmol of triisobutyl aluminum and 8.4 mmol, based on Al, of methyl alumoxane (PMAO-3A, manufactured by TOSOH AKZO K.K.) were added, the internal temperature was raised to 70° C., and ethylene was immediately introduced. After the pressure was stabilized at 0.6 MPa (5 Kg/cm$^2$G), from a catalyst tank installed above the autoclave, about 50 ml of a toluene solution having 8.4 μmol of rac-dimethylenebis(4,5-benzo-1-indenyl)zirconium dichloride and 0.84 mmol of triisobutylaluminum dissolved therein, was added to the autoclave. Polymerization was carried out for 20 minutes while maintaining the internal temperature at 70° C. and the pressure at 0.6 MPa (the integrated flow amount of the ethylene was about 150 L). A small amount of the polymer solution was sampled, and then the ethylene pressure was rapidly (within 1 minute) increased to 0.7 MPa, and the pressure of 0.7 MPa was maintained until the integrated flow amount of ethylene (including the amount of ethylene used for increasing the pressure by 0.1 MPa) reached 50 L. Then, the ethylene pressure was further increased by 0.1 MPa at each step to carry out each polymerization step until the integrated flow amount of ethylene reached 70 L. It took one hour and forty minutes from initiation of the pressure increase until the ethylene pressure reached 1.1 MPa. Further, when the integrated flow amount of ethylene under a pressure of 1.1 MPa reached 100 L (2 hours and 55 minutes after initiation of the polymerization), the ethylene pressure was removed to terminate the polymerization. In the above polymerization, the internal temperature was maintained at from 70 to 75° C. After completion of the polymerization, the obtained polymer solution was introduced in small portions into a large amount of a methanol solution which was vigorously stirred, to recover the polymer. This polymer was dried in an air at room temperature for one day, and then dried under vacuum at 80° C. until change in mass was no longer observed. 920 g of the polymer (polymer P-1) was obtained.

Of the copolymer obtained in Example 1, MFR was measured in accordance with JIS K7210 at a measurement temperature of 230° C. at loads of 2 kg and 10 kg, whereupon they were 0.29 g/10 min and 5.2 g/10 min, respectively. As a result, the ratio of MFR at loads of 10 kg and 2 kg of the copolymer ($I_{10}/I_2$) was 18.

Example 2

Employing the same polymerization apparatus as in Example 1, 4,400 ml of toluene and 400 ml of styrene were charged. About 200 L of nitrogen was bubbled to purge the interior of the system and the polymerization solution at an internal temperature of 70° C. 8.4 mmol of triisobutyl aluminum and 21 mmol, based on Al, of methyl alumoxane (PMAO-3A, manufactured by TOSO AKZO K.K.) were added, and ethylene was immediately introduced. After the pressure was stabilized at 0.25 MPa (1.5 Kg/cm$^2$G), from a catalyst tank installed above the autoclave, about 50 mL of a toluene solution having 8.4 μmol of rac-dimethylmethylenebis(4,5-benzo-1-inenyl)zirconium dichloride and 0.84 mmol of triisobutyl aluminum dissolved therein, was added to the autoclave. Polymerization was carried out for 48 minutes while maintaining the internal temperature at 70° C. and the pressure at 0.25 MPa. At this stage, the amount of ethylene consumed was about 150 L in a standard state. Then, ethylene was introduced, and the pressure in the system was continuously increased to 1.1 MPa over a period of 25 minutes. Polymerization was accelerated by increase in the ethylene pressure, and the internal temperature was increased from 70° C. to 83° C. at one point. Polymerization was carried out totally for 1 hour and 43 minutes while maintaining the pressure at 1.1 MPa.

The post treatment was carried out in the same manner as in Example 1 to obtain 912 g of a polymer (polymer P-2).

In both Examples 1 and 2, the polymer concentration when the polymerization was completed was at least about 20 mass % based on the polymerization solution (about 4 kg).

Polymerization conditions of the respective Examples, the analytical results of the obtained polymers, and physical properties of the obtained polymers are shown in Table 1, Table 2 and Table 3, respectively.

The styrene monomer conversion ratio (%) (Table 1) was obtained from the mass of the styrene monomer copolymerized based on the mass of the styrene monomer used for polymerization. The mass of the styrene monomer copolymerized was obtained from the mass of the obtained copolymer and the styrene content. In the copolymer obtained by the present Example, a crystal structure derived from an ethylene chain structure was observed by X-ray diffraction analysis.

Figure 3:
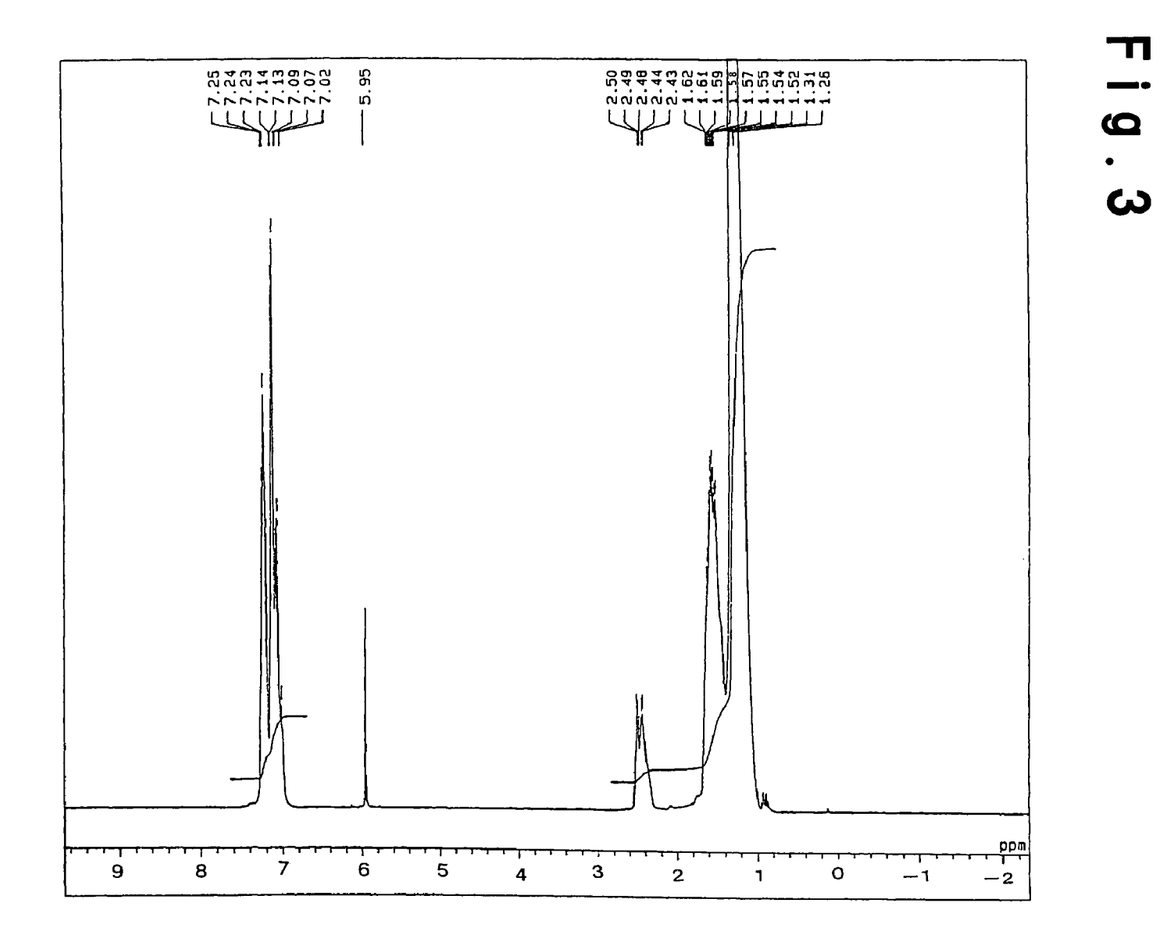
FIG. 3 illustrates $^1$H-NMR spectrum of the copolymer obtained in Example 1.
Figure 4:
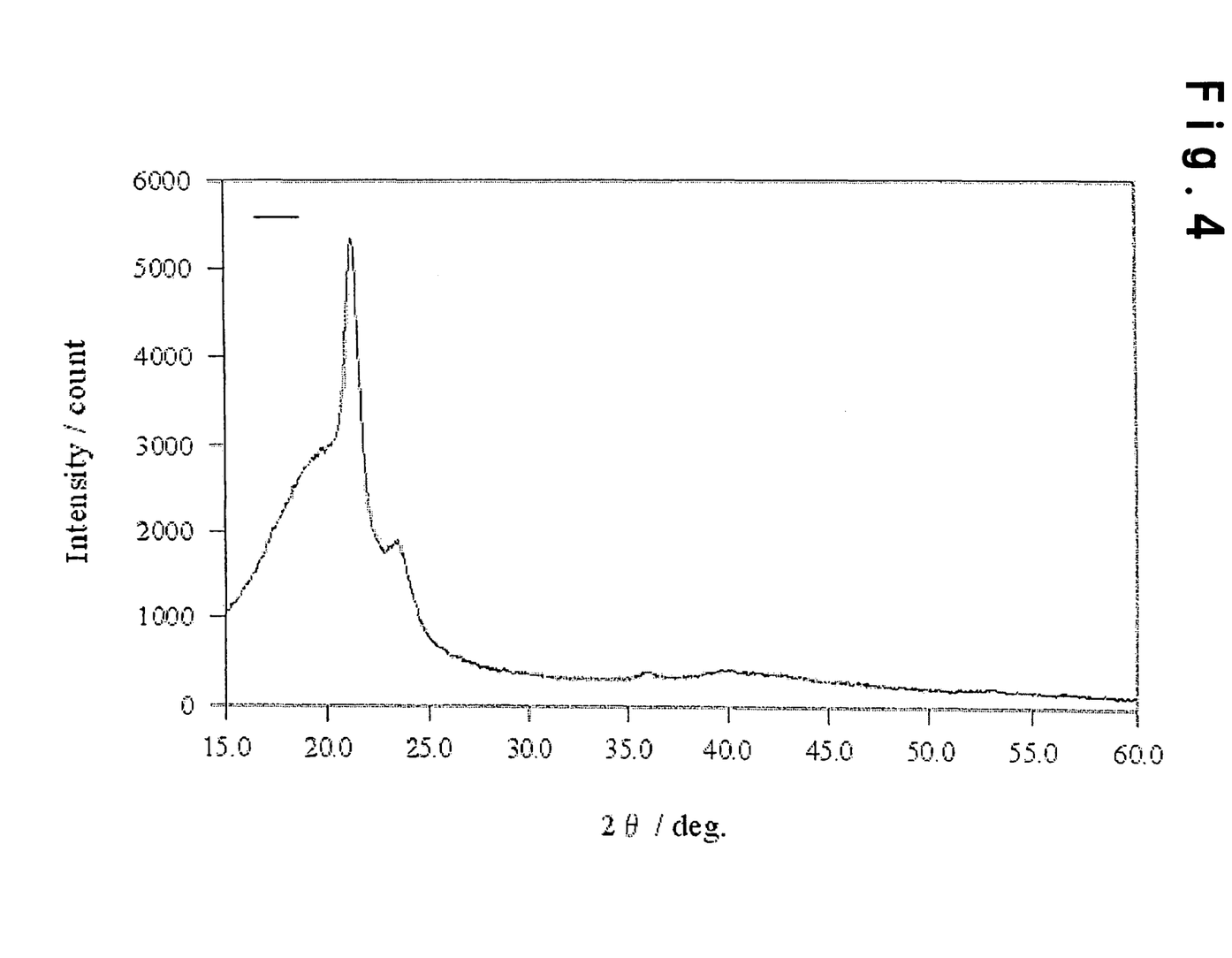
FIG. 4 illustrates X-ray diffraction spectrum of the copolymer obtained in Example 1.

$^1$H-NMR spectrum of the copolymer obtained in Example 1 and X-ray diffraction spectrum of the copolymer obtained in Example 1 are shown in FIGS. 3 and 4, respectively.

Comparative Examples 1 to 6

Ethylene/styrene copolymers having various styrene contents obtained by polymerization carried out in the method disclosed in EP-0872492A2 and JP-A-11-130808 using rac-dimethylmethylenebis(4,5-benzo-1-indenyl)zirconium dichloride as a catalyst and methyl alumoxane (MAO) as a cocatalyst (polymerization temperature: from 50° C. to 70° C.), under an ethylene pressure of 1.1 MPa, are shown in Table 4 (such copolymers were obtained under a condition of a styrene conversion ratio less than 50 mol %). The physical properties are shown in Table 5.

Comparative Example 7

Using a Brabender Plastic-Corder (PLE331 model, manufactured by Brabender Company), 25 g of each of copolymers RP-2 and RP-6 was melted, and then kneading (external temperature: 180° C., rotational speed: 60 rpm, time: 10 minutes) was carried out to obtain a composition. The obtained ethylene/styrene copolymer composition was molded by the above-mentioned press molding to obtain a sheet of 1 mm in thickness, and evaluation of various physical properties was carried out. The physical properties are shown in Table 5.

The copolymers (P-1, P-2) of Examples are copolymers obtained under such polymerization conditions that the styrene conversion ratio is so high as at least 50% when the polymerization is completed, and that the polymer concentration in the polymerization solution is at least 10 mass %, while changing the ethylene pressure during the polymerization, i.e. copolymers obtained by carrying out the polymerization under such a polymerization condition that the ethylene pressure when the polymerization is completed is high as compared with that at the initiation of the polymerization (gradient ethylene pressure condition). The copolymers obtained in Examples had a relatively high melting point. They had a melting point higher by about 10° C. as compared with the ethylene/styrene copolymers (RP-1 to RP-6) of Comparative Examples having the same composition obtained by a conventional polymerization, i.e. in such a condition that the same catalyst (transition metal compound) and cocatalyst as in Examples were employed, the styrene conversion ratio was at most about 50%, and the ethylene pressure during the polymerization was maintained constant during the polymerization.

Figure 1:
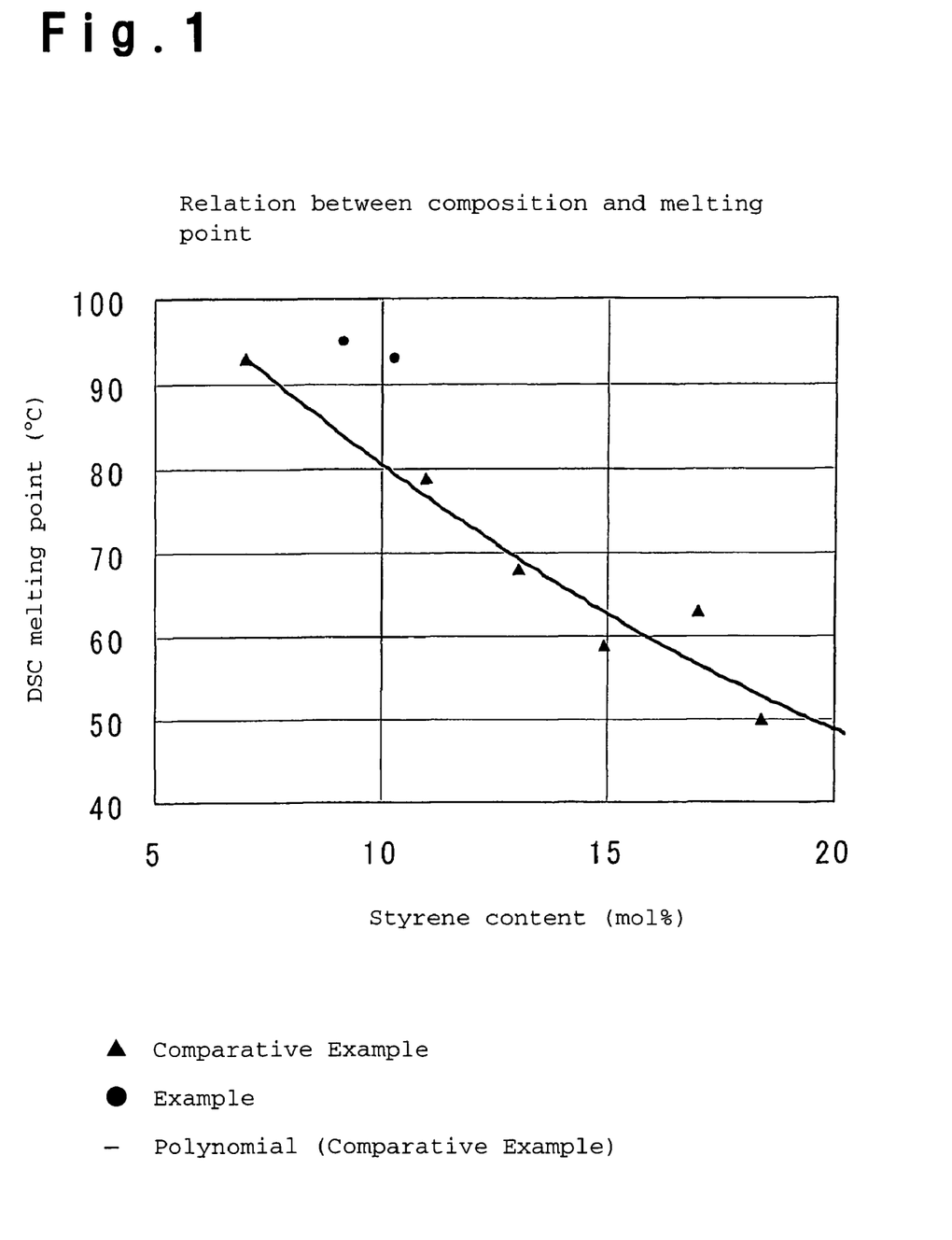
FIG. 1 illustrates the relation between the composition (styrene content) and the melting point of each of copolymers in Examples and Comparative Examples.

In FIG. 1, the relation between the composition and the melting point of the ethylene/styrene copolymers (RP-1 to RP-6) of Comparative Examples and the copolymers (P-1 to 2) obtained in Examples is shown.

Further, of the ethylene copolymers (P-1 to 2) obtained at a high styrene conversion ratio under a gradient ethylene pressure condition, the transparency also is the same or rather excellent as compared with the copolymers (RP-1 to RP-6) obtained by a conventional polymerization method.

Further, of the composition (Comparative Example 7) obtained by blending the copolymers of Comparative Examples having different compositions, the transparency significantly decreases.

Figure 2:
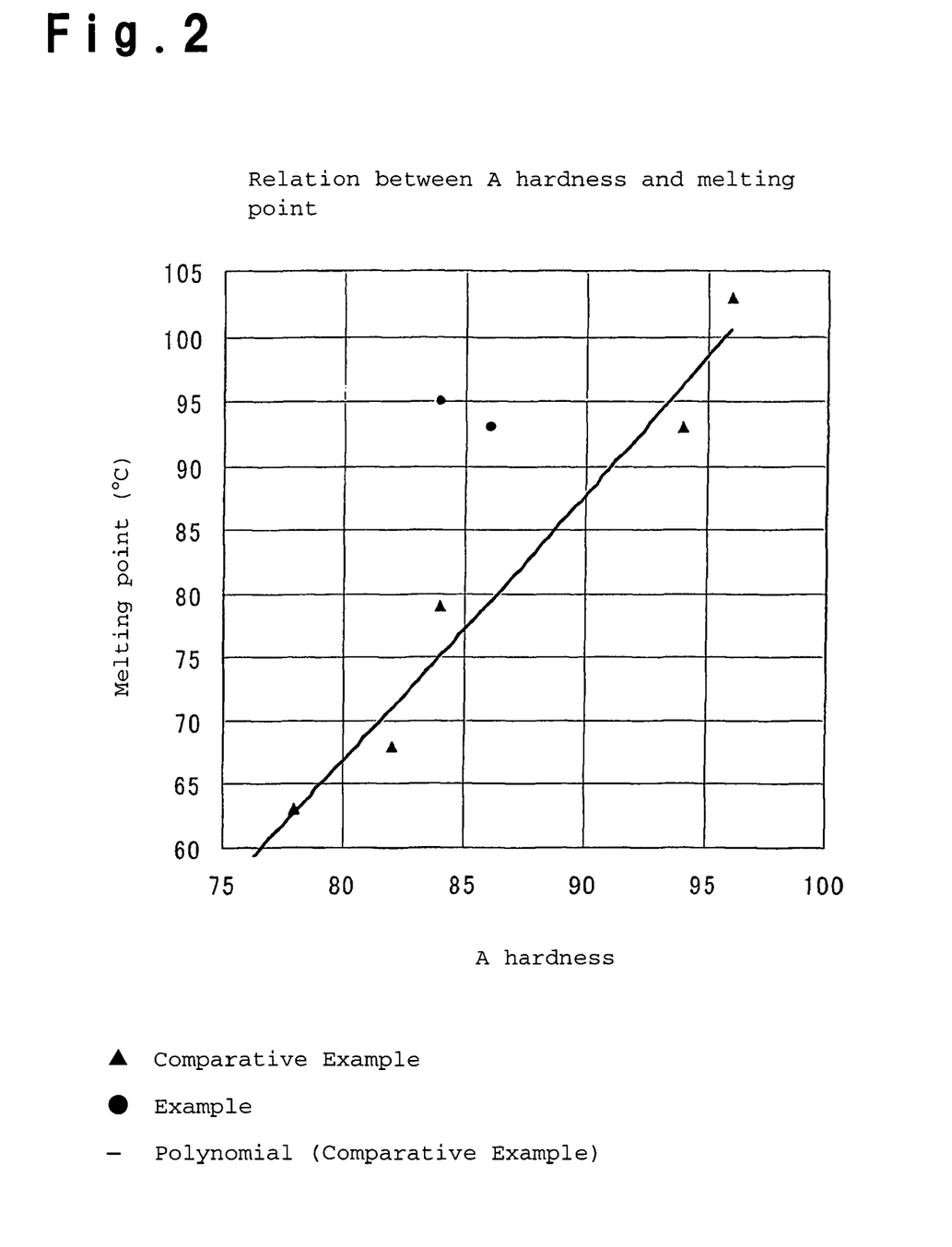
FIG. 2 illustrates the relation between the melting point and the A hardness of each of copolymers in Examples and Comparative Examples.

In FIG. 2, the relation between the A hardness and the melting point as measured by DSC of the ethylene/styrene copolymers (RP-1 to RP-6) of Comparative Examples and the copolymers (P-1 to 2) obtained in Examples is shown. It is found that the copolymers obtained in Examples have a high melting point as compared with the copolymers obtained in Comparative Examples at the same hardness. Further, it is found that the copolymers obtained in Examples have low hardness as compared with the copolymers obtained in Comparative Examples at the same melting point. Namely, the copolymers obtained in the present Examples have such a characteristic that they satisfy both flexibility and heat resistance. Further, as mentioned above, the copolymers of the present Examples have high transparency.

TABLE 1

| Ex. Comp. Ex. | Catalyst | Catalyst amount (μmol) | MAO (mmol) | Solvent (ml) | Styrene (ml) | Ethylene pressure (MPa) | Polymerization temperature (° C.) | Polymerization time | Yield (g) | Styrene conversion ratio % |
|---|---|---|---|---|---|---|---|---|---|---|
| Ex. 1 | A | 8.4 | P: 8.4 | C4400 | 400 | 0.6 to 1.1 increased by 0.1 MPa in stages, 70 l of ethylene consumed with every increase of 0.1 MPa | 70 to 75 | 2 h 55 min | 920 | 70 |
| Ex. 2 | A | 8.4 | P: 8.4 | T4400 | 400 | 0.25 to 1.1 continuously increased | 70 to 83 | 1 h 43 min | 912 | 75 |

Transition metal compound used as a catalyst

A: rac-isopropylidenebis (4,5-benzoindenyl)zirconium dichloride

T: toluene

C: cyclohexane

—: no monomer used

P: methyl alumoxane (PMAO-3A, manufactured by TOSO AKZO K.K.)

TABLE 2

| Ex. Comp. Ex. | Polymer | Styrene content (mol %) | $Mw/10^4$ | Mw/Mn | Melting point (° C.) | Heat of crystal fusion J/g | Glass transition point (° C.) |
|---|---|---|---|---|---|---|---|
| Ex. 1 | P-1 | 9.2 | 22.2 | 3.2 | 95 | 42 | −20 |
| Ex. 2 | P-2 | 10.3 | 17.9 | 4.2 | 93 | 65 | −20 |

TABLE 3

Physical properties

| Ex. Comp. | | Elongation | Breaking strength | Elastic modulus in tension | 100% Mo | 300% Mo | Transparency | | Hardness | | Vicat softening point |
|---|---|---|---|---|---|---|---|---|---|---|---|
| | | | | | | | Haze | Total light transmittance | | | |
| Ex. | Polymer | % | MPa | MPa | MPa | MPa | % | % | A | D | °C. |
| Ex. 1 | P-1 | 447 | 37 | 22 | 5.8 | 10.3 | 12 | 85 | 84 | 25 | 87 |
| Ex. 2 | P-2 | 500 | 28 | 25 | 5.7 | 9.3 | 10 | 81 | 86 | 35 | 88 |

TABLE 4

| | | St content mol % | Mw/10⁴ | Mw/Mn | Melting point °C. | Glass transition point °C. |
|---|---|---|---|---|---|---|
| Comp. Ex. 1 | RP-1 | 5 | 18.5 | 2.1 | 103 | −25 |
| Comp. Ex. 2 | RP-2 | 7 | 18.0 | 2.0 | 93 | −28 |
| Comp. Ex. 3 | RP-3 | 11 | 16.0 | 1.9 | 79 | −22 |
| Comp. Ex. 4 | RP-4 | 13 | 22.7 | 2.0 | 68 | −23 |
| Comp. Ex. 5 | RP-5 | 17 | 17.5 | 2.0 | 63 | −22 |
| Comp. Ex. 6 | RP-6 | 21 | 18.5 | 2.0 | Unmeasured | Unmeasured |

TABLE 5

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Kind of polymer | RP-1 5 mol % | RP-2 7 mol % | RP-3 11 mol % | RP-4 13 mol % | RP-5 17 mol % | RP-6 21 mol % | RP-2 + RP-6 |
| Breaking elongation (%) | 630 | 533 | 450 | 440 | 500 | 1333 | 533 |
| Yield strength (MPa) | Yield point not observed | Yield point not observed | Yield point not observed | Yield point not observed | Yield point not observed | Yield point not observed | Yield point not observed |
| Breaking strength (MPa) | 34.0 | 50.0 | 45.0 | 36.0 | 48.0 | 7.6 | 34.3 |
| Elastic modulus in tension (MPa) | 66.0 | 34.0 | 18.0 | 17.0 | 9.0 | 3.1 | 14.5 |
| 100% modulus (MPa) | 9.0 | 6.0 | 5.0 | 4.0 | 3.0 | 1.3 | 3.8 |
| 300% modulus (MPa) | 11.0 | 10.0 | 9.0 | 8.0 | 6.0 | 1.6 | 6.9 |
| Hardness (Shore A) | 96 | 94 | 84 | 82 | 78 | 63 | 82 |
| Hardness (Shore D) | 47 | 44 | 31 | 30 | 25 | 19 | 31 |
| Total light transmittance (%) | 80 | 85 | 82 | 86 | Unmeasured | 84 | 73 |
| Haze (%) | 20 | 13 | 22 | 12 | Unmeasured | 12 | 47 |

INDUSTRIAL APPLICABILITY

The copolymers of the present Examples obtained under such a condition that both high styrene conversion ratio and gradient ethylene pressure condition are satisfied, have excellent transparency and further have both flexibility and heat resistance.

The invention claimed is:

1. A process for producing an olefin/aromatic vinyl compound copolymer, which comprises carrying out polymerization in such a manner that (1) at least one of conditions (a) polymerization is carried out to an aromatic vinyl compound monomer conversion ratio of at least 50 mol % when the polymerization is completed, and (b) the polymer concentration is at least 10 mass % relative to the polymerization solution when the polymerization is completed, is satisfied, and (2) olefin partial pressure is changed during the polymerization so that the olefin partial pressure when the polymerization is completed is from 1.3 to 20 times the olefin partial pressure at the initiation of the polymerization.

2. A process for producing an olefin/aromatic vinyl compound copolymer, which comprises carrying out copolymerization in such a manner that conditions such that the aromatic vinyl compound monomer conversion ratio is at least 50 mol % when the polymerization is completed, and that the polymer concentration is at least 10 mass % relative to the polymerization solution when the polymerization is completed, are satisfied, and olefin partial pressure is changed during the polymerization so that the olefin partial pressure when the polymerization is completed is from 1.3 to 20 times the olefin partial pressure at the initiation of the polymerization.

3. An olefin/aromatic vinyl compound copolymer, which is obtained by the production process as defined in claim 1,
wherein an A hardness, and at least one melting point among melting points with a heat of crystal fusion of from 10 J/g to 150 J/g as measured by DSC, satisfy the following relation:

A<Tm<120

70<A<88 wherein Tm is at least one melting point (° C.) with a heat of crystal fusion of from 10 J/g to 150 J/g as measured by DSC, and
A is A hardness.

4. The olefin/aromatic vinyl compound copolymer according to claim 3, which has an aromatic vinyl compound content of from 1 to 99 mol %.

5. The olefin/aromatic vinyl compound copolymer according to claim 3, wherein the olefin is ethylene.

6. The olefin/aromatic vinyl compound copolymer according to claim 3, wherein the aromatic vinyl compound is styrene.

7. The olefin/aromatic vinyl compound copolymer according to claim 3, wherein the aromatic vinyl compound content, and at least one melting point among melting points with a heat of crystal fusion of from 10 J/g to 150 J/g as measured by DSC, satisfy the following relation:

−3·St+120<Tm<120 if (5<St<15); and

75<Tm<120 if (15<St<50)

wherein Tm is a melting point (° C.) with a heat of crystal fusion of from 10 J/g to 150 J/g as measured by DSC, and
St is aromatic vinyl compound content (mol %).

8. The olefin/aromatic vinyl compound copolymer according to claim 3, wherein the ratio of MFR measured at a measurement temperature of 230° C. at loads of 10 kg and 2 kg ($I_{10}/I_2$) is from 10 to 50.

9. The olefin/aromatic vinyl compound copolymer according to claim 3, wherein the molecular weight distribution (Mw/Mn), as calculated as standard polystyrene, is from 2 to 6, as obtained by GPC (gel permeation chromatography) measurement employing RI (differential refractive index meter) as a detector employing o-dichlorobenzene as a measurement solvent at a measurement temperature of 145° C.

10. The process for producing an olefin/aromatic vinyl compound copolymer according to claim 1, wherein a catalyst used for the polymerization is a single site coordination polymerization catalyst comprising a transition metal compound and a cocatalyst.

11. The process for producing an olefin/aromatic vinyl compound copolymer according to claim 10, wherein the single site coordination polymerization catalyst is a polymerization catalyst comprising a transition metal compound represented by the following general formula (1) and a cocatalyst:

General Formula (1)

wherein each of A and B which are independent of each other, is an unsubstituted or substituted benzindenyl group, an unsubstituted or substituted cyclopentadienyl group, an unsubstituted or substituted indenyl group, or an unsubstituted or substituted fluorenyl group;
Y is a methylene group, a silylene group, an ethylene group, a germylene group or a boron residue, which has bonds to A and B and which further has hydrogen or a group containing a $C_{1-20}$ hydrocarbon (the group may contain from 1 to 3 nitrogen, boron, silicon, phosphorus, selenium, oxygen or sulfur atom(s)), as substituents, the substituents may be the same or different from one another, and Y may have a cyclic structure;
each X is independently hydrogen, a halogen, a $C_{1-15}$ alkyl group, a $C_{3-20}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amide group having hydrogen or a $C_{1-22}$ hydrocarbon substituent, and n is an integer of 0, 1 or 2, provided that when n is 2, the two X's may have a bond to each other; and
M is zirconium, hafnium or titanium.

12. The process for producing an olefin/aromatic vinyl compound copolymer according to claim 10, wherein at least one of A and B in the general formula (1) is a group selected from an unsubstituted or substituted benzindenyl group and an unsubstituted or substituted indenyl group.

13. An olefin/aromatic vinyl compound copolymer, wherein the A hardness, and at least one melting point among melting points with a heat of crystal fusion of from 10 J/g to 150 J/g as measured by DSC, satisfy the following relation:

A<Tm<120

70<A<88 wherein Tm is a melting point (° C.), and
A is A hardness.

14. An olefin/aromatic vinyl compound copolymer, wherein the ratio of MFR measured at a measurement temperature of 230° C. at loads of 10 kg and 2 kg ($I_{10}/I_2$) is from 10 to 50.

15. The olefin/aromatic vinyl compound copolymer according to claim 14, wherein the molecular weight distribution (Mw/Mn), as calculated as standard polystyrene, is from 2 to 6, as obtained by GPC (gel permeation chromatography) measurement employing RI (differential refractive index meter) as a detector employing o-dichlorobenzene as a measurement solvent at a measurement temperature of 145° C.

16. An olefin/aromatic vinyl compound copolymer, which is obtained by the production process as defined in claim 2, wherein an A hardness, and at least one melting point among melting points with a heat of crystal fusion of from 10 J/g to 150 J/g as measured by DSC, satisfy the following relation:

A<Tm<120

70<A<88 wherein Tm is at least one melting point (° C.) with a heat of crystal fusion of from 10 J/g to 150 J/g as measured by DSC, and A is A hardness.

17. The olefin/aromatic vinyl compound copolymer according to claim 13, which has a total light transmittance of at least 80% in a form of a molded product of 1 mm in thickness.

18. The olefin/aromatic vinyl compound copolymer according to claim 13, which has a haze of at most 15% in a form of a molded product of 1 mm in thickness.

19. The olefin/aromatic vinyl compound copolymer according to claim 14, which has a total light transmittance of at least 80% in a form of a molded product of 1 mm in thickness.

20. The olefin/aromatic vinyl compound copolymer according to claim 14, which has a haze of at most 15% in a form of a molded product of 1 mm in thickness.

21. The process for producing an olefin/aromatic vinyl compound copolymer according to claim 11, wherein Y in formula (I) is a cyclohexylidene group or a cyclopentylidene group.

22. The olefin/aromatic vinyl compound copolymer as claimed in claim 3, which has a haze of at most 15% in a form of a molded product of 1 mm in thickness.

23. An olefin/aromatic vinyl compound copolymer, which is obtained by the production process as defined in claim 1, wherein the ratio of MFR measured at a measurement temperature of 230° C. at loads of 10 kg and 2 kg ($I_{10}/I_2$) is from 10 to 50.

24. The olefin/aromatic vinyl compound copolymer as claimed in claim 23, which has a haze of at most 15% in a form of a molded product of 1 mm in thickness.

25. The olefin/aromatic vinyl compound copolymer according to claim 23, which has an aromatic vinyl compound content of from 1 to 99 mol %.

26. The olefin/aromatic vinyl compound copolymer according to claim 23, wherein the olefin is ethylene.

27. The olefin/aromatic vinyl compound copolymer according to claim 23, wherein the aromatic vinyl compound is styrene.

28. The olefin/aromatic vinyl compound copolymer according to claim 23, wherein the aromatic vinyl compound content, and at least one melting point among melting points with a heat of crystal fusion of from 10 J/g to 150 J/g as measured by DSC, satisfy the following relation:

−3·St+120<Tm<120 if (5<St<15); and

75<Tm<120 if (15<St<50)

wherein Tm is a melting point (° C.) with a heat of crystal fusion of from 10 J/g to 150 J/g as measured by DSC, and St is aromatic vinyl compound content (mol %).

29. The olefin/aromatic vinyl compound copolymer according to claim 23, wherein the molecular weight distribution (Mw/Mn), as calculated as standard polystyrene, is from 2 to 6, as obtained by GPC (gel permeation chromatography) measurement employing RI (differential refractive index meter) as a detector employing o-dichlorobenzene as a measurement solvent at a measurement temperature of 145° C.

30. The olefin/aromatic vinyl compound copolymer as claimed in claim 16, which has a haze of at most 15% in a form of a molded product of 1 mm in thickness.

31. The olefin/aromatic vinyl compound copolymer, which is obtained by the production process as defined in claim 2, wherein the ratio of MFR measured at a measurement temperature of 230° C. at loads of 10 kg and 2 kg ($I_{10}/I_2$) is from 10 to 50.

32. The olefin/aromatic vinyl compound copolymer as claimed in claim 31, which has a haze of at most 15% in a form of a molded product of 1 mm in thickness.

* * * * *